US005644685A

United States Patent [19]
Baehr

[11] Patent Number: 5,644,685
[45] Date of Patent: Jul. 1, 1997

[54] LASER PRINTER OUTPUT DIRECTOR

[75] Inventor: Geoffrey G. Baehr, Menlo Park, Calif.

[73] Assignee: Sun Microsystems, Inc., Mountain View, Calif.

[21] Appl. No.: 349,924

[22] Filed: Dec. 6, 1994

[51] Int. Cl.⁶ .................................................. G06K 15/02
[52] U.S. Cl. .......................................... 395/111; 271/298
[58] Field of Search ........................... 395/111; 271/298; 358/402, 407, 440, 296, 300

[56] References Cited

U.S. PATENT DOCUMENTS 5,435,544  7/1995  Mandel .................................. 271/298

FOREIGN PATENT DOCUMENTS

0622694A2  4/1994  European Pat. Off. .
0622694A3  4/1994  European Pat. Off. .

OTHER PUBLICATIONS

Patent Abstracts of Japan, vol. 017 No. 673 (P–1658), Dec. 10, 1993 and JP–A–05 224837 (Fuji Xerox Co Ltd) Sep. 3, 1993.

Patent Abstracts of Japan, vol. 018 No. 323 (M–1624), Jun. 20, 1994 and JP–A–06 072623 (Fuji Xerox Co Ltd) Mar. 15, 1994.

Primary Examiner—Scott A. Rogers
Attorney, Agent, or Firm—Blakely Sokoloff Taylor & Zafman

[57] ABSTRACT

In the present invention, a microprocessor controls a moveable output hopper with multiple paper slots attached to a laser printer. Print jobs of different users are directed to separate open slots by user name or other identifier corresponding to a particular user. A small LCD panel for each slot displays an identifier representing the user whose job is currently using the output slot. Incoming print data to the laser printer is monitored for a banner page. The user name or identifier is then extracted from the banner page, and if the current job is for a new user, the trays are moved and the print job is output to the first unused tray. A user name or identifier corresponding to the printed output is also displayed on an LCD panel corresponding to a particular tray. If all trays are full, print jobs are sent to a tray designated as the default/shared tray.

17 Claims, 2 Drawing Sheets

LASER PRINTER OUTPUT DIRECTOR

BACKGROUND OF THE INVENTION

1. Field of the Invention

The present invention relates to the field of laser printers. More particularly, the present invention relates to directing and sorting the outputs of a stand alone printer to specific printer output holders corresponding to the user requesting the print job.

2. Description of Related Art

Current laser printers deliver printed output pages of all printer users combined into a single tray. Individual user printer output is distinguished by a banner page printed at the start of each print job, inserted by a printing controller program.

Most laser printers are equipped with more than one input slot (feed tray) on which different size paper and envelopes are placed. However, a typical laser printer only has a single output slot or tray, to which all output is routed.

To create greater efficiency in the delivery of printed output pages and to clarify the identification of printed outputs, a method and apparatus for a sorting device capable of segregating print jobs according to different users and outputting the print jobs onto separate output trays is desired.

SUMMARY OF THE INVENTION

The present invention provides a method and apparatus for a laser printer output director. In the present invention, a microprocessor controls a moveable output hopper with multiple paper slots attached to a laser printer. Print jobs of different users are directed to separate open slots by user name or other identifier corresponding to a particular user. A small LCD panel attached to each slot displays an identifier representing the user whose job is currently residing in that output slot.

Incoming print data to the laser printer is monitored for data patterns not associated with actual print data. When such "non print data" is detected, software control logic running on the microprocessor determines if the data patterns are associated with a banner page from a printer control program. If they are, the user name or identifier is then extracted from the data pattern, and if the current job is for a new user, the trays are moved and the print job is output to the first unused tray. A user name or identifier corresponding to the printed output is also displayed on an LCD panel corresponding to that particular tray. If all trays are full, print jobs are sent to a tray designated as the default/shared overflow tray.

In an alternate embodiment, specific control characters transparent to printers without the printer output director of the present invention, are inserted into the beginning of a stream of data associated with a print job. The control characters are then transmitted to a laser printer. Such control characters are inserted by software running on a host PC or work station. The control logic of the laser printer recognizes specific control characters which indicates an incoming new print job.

The print job is then delivered to the first open slot. The corresponding user name or identifier associated with the print job is displayed on the corresponding LCD panel for that slot.

The printer output director of the present invention provides user friendly efficiency allowing printer users to quickly identify their respective print job outputs.

DETAILED DESCRIPTION OF THE INVENTION

Methods and apparatus for a laser printer output director are disclosed. The printer output director of the present invention allows for print jobs of different users to be delivered to separate output trays.

Further, an LCD panel is associated with each output tray. A user name or identifier corresponding to a particular print job being delivered to an output tray is displayed on the corresponding LCD panel.

Figure 1:
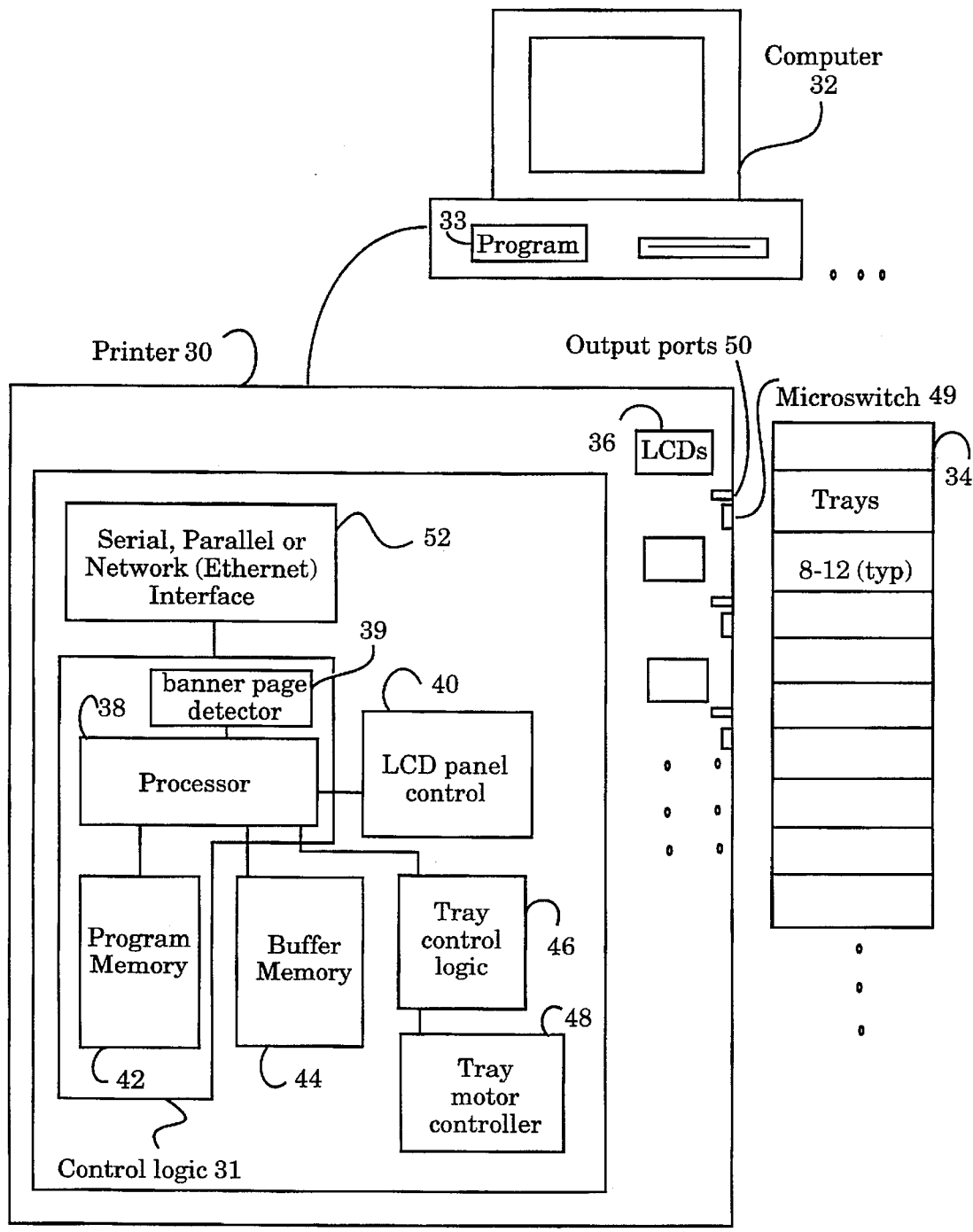
FIG. 1 is a block diagram illustrating the laser printer output director of the present invention.

FIG. 1 is a block diagram illustrating the printer output director of the present invention. A user utilizing computer 32 interfaced with printer 30, requests a print job to be performed on printer 30. Printer 30 includes a moveable stack of trays 34 which may be positioned by tray motor controller 48 at output ports 50.

Trays 34 may be attached to printer 30 with a series of Velcro tabs. Processor 38 of control logic 31 controls the printer output director of the present invention. Serial, parallel or network (Ethernet) interface 52 is coupled to control logic 31. Banner page detector 39 of control logic 31 monitors data transmitted from computer 32 for characteristic data indicating that a banner page is coming. A banner page indicates a start of each print job and typically contains a user name or identifier. Most PC's and work stations have the same data format to indicate a banner page.

In one embodiment of the present invention, program 33 running on computer 32 transmits certain character sets such as control characters to control logic 31 of printer 30, indicating that the subsequent incoming serial data output from computer 32 to printer 30 is for a banner page. The control characters are not printed on the output pages and are transparent to typical printers.

In an alternate embodiment of the present invention, banner page detector 39 differentiates the banner page from the actual printed output by monitoring the format of the incoming data. Typical actual printed output data is in the format of a PostScript®, Adobe PCL® (Hewlett Packard® description language) or a type font. Banner page detector 39 of printer 30 monitors the incoming serial data from computer 32 to printer 30, and if the incoming data is not in one of the formats for an actual printed output, then banner page detector 39 determines that the incoming data is for a banner page.

Through use of one of the above described methods, a banner page is detected. Processor 38 stores the banner page information, including user name/identifier, into buffer memory 44. If a slot in trays 34 is not allocated for the particular user as identified in the banner page, then a tray is allocated for that user name. Tray control logic 46 activates tray motor controller 48 to move the next free output slot in trays 34 to the printer output port. If there are no open trays, then the print job is delivered to a "shared" tray. LCD panel 36 displays whether or not a tray is being shared.

User name or identifier corresponding to the incoming print job is extracted from the banner information stored in buffer memory 44. LCD panel control 40 then writes the user name or identifier to LCD panel 36 corresponding to the allocated output tray 34. The identifier to be displayed on the LCD panel 36 may be formatted in many different ways. For example a user's initials, first name or whole name may be displayed, under software/user control.

Once the user takes the printed pages out of its tray 34, microswitch 49 activated by the weight of the output pages indicates that the particular tray is empty. LCD panel 36 displaying the identifier for the corresponding tray displays the default display (e.g. blank display), as controlled by LCD panel control circuitry 40. The slot associated with the empty tray is inserted into a list of available trays and stored in program memory 42.

The overall design may be implemented using conventional CMOS and TTL components, with interfaces to computer 32 using standard integrated I/O and interface controller devices. More specifically, in an exemplary embodiment, the present invention may be implemented with an 8051 micro controller, interfaced to a 256 KB of main ROM 42.

A byte wide (8 bit) I/O may be conducted via another memory mapping 16 bit wide ROM 44 to various address spaces. Each of these address spaces may be mapped onto an I/O port of an I/O controller (interface 52) for a particular interface. The system program code may be stored in the main ROM devices.

Interface 52 may consist of Cybernetic Microsystems Intelligent stepper motor controller, AMD Lance Ethernet controller for Ethernet connection and a National 16550 B UART, connected to a serial port and a parallel input port to monitor I/O streams. The Ethernet controller may be connected via an analog network interface to standard IEEE 802.3 10 Base T Ethernet interfaces. Data passes through the Ethernet In and Out ports just as with serial and parallel port connectors. The serial and parallel ports may be pass through devices using Max232 RS232 - TTL level converters, with I/O from the port being sent to the 8051 device stored program.

Interrupts from theses devices may be received using an Intel 8259 interrupt controller, with interrupt routines being serviced by the 8051 with standard TTL latches. It may be clocked out to the "passthrough" or output port synchronously with the input data.

The program code in CPU ROM 42 of control logic 31 examines either the serial/parallel or Ethernet data passing through the system. If the program code detects a match on a banner page, a STEP command is sent to tray motor controller 48 to move the output tray to an open tray. Tray position may be sensed by an HP 15700 serial photodetector. Tabs on the side of the tray block the light, allowing counts to be performed of "trays gone by". The total trays occupied/used is accumulated by the micro controller using the photodetector data.

Each tray from trays 34 may have a Hitachi 2 line by 40 character LCD 36 matrix display attached to it. Character matrix data is looked up by the micro controller and sent via the I/O bus to the address associated with each tray 34's display 36 which are memory mapped. The data is strobed to the display 36 at intervals to update the status for the output job present in tray 34.

Microswitch 49 in each tray 34, normally open, is closed when paper is present on tray 34. A CMOS latch (4011) debounces the switch contacts. When paper is injected into tray 34, the switch closes, sending a +5 V signal to a TTL multiplexor, which interrupts processor 38 and indicates which tray 34 is receiving paper (BCD). Tray movement may be controlled by a CY motor controller (tray motor controller 48).

A switch mode power supply providing +5 +12 VDC may be enclosed in a cabinet of printer 30, with Female and Male DB25 serial connectors (In/Out), DB25 Parallel (In/Out) Female and Male connectors and 2 RJ-45 10 Base T 10 Mb Twisted pair Ethernet connectors on the front panel.

The system, upon power up, boots into operation from ROM 42 and begins to examine serial, parallel and Ethernet connections for printing jobs passing through printer 30. When a job is sensed, by decoding the printing protocol/signaling protocol, the system begins to move the tray stack 34 to an open slot to prepare for output.

The present invention is not dependent upon printer type, or in any way serializes or slows down the printing mechanism, it is an "inspect mode" monitoring system. In addition, the present invention may also be implemented with Facsimile machines, and other digital machines which receive data and outputs printed pages.

Figure 2:
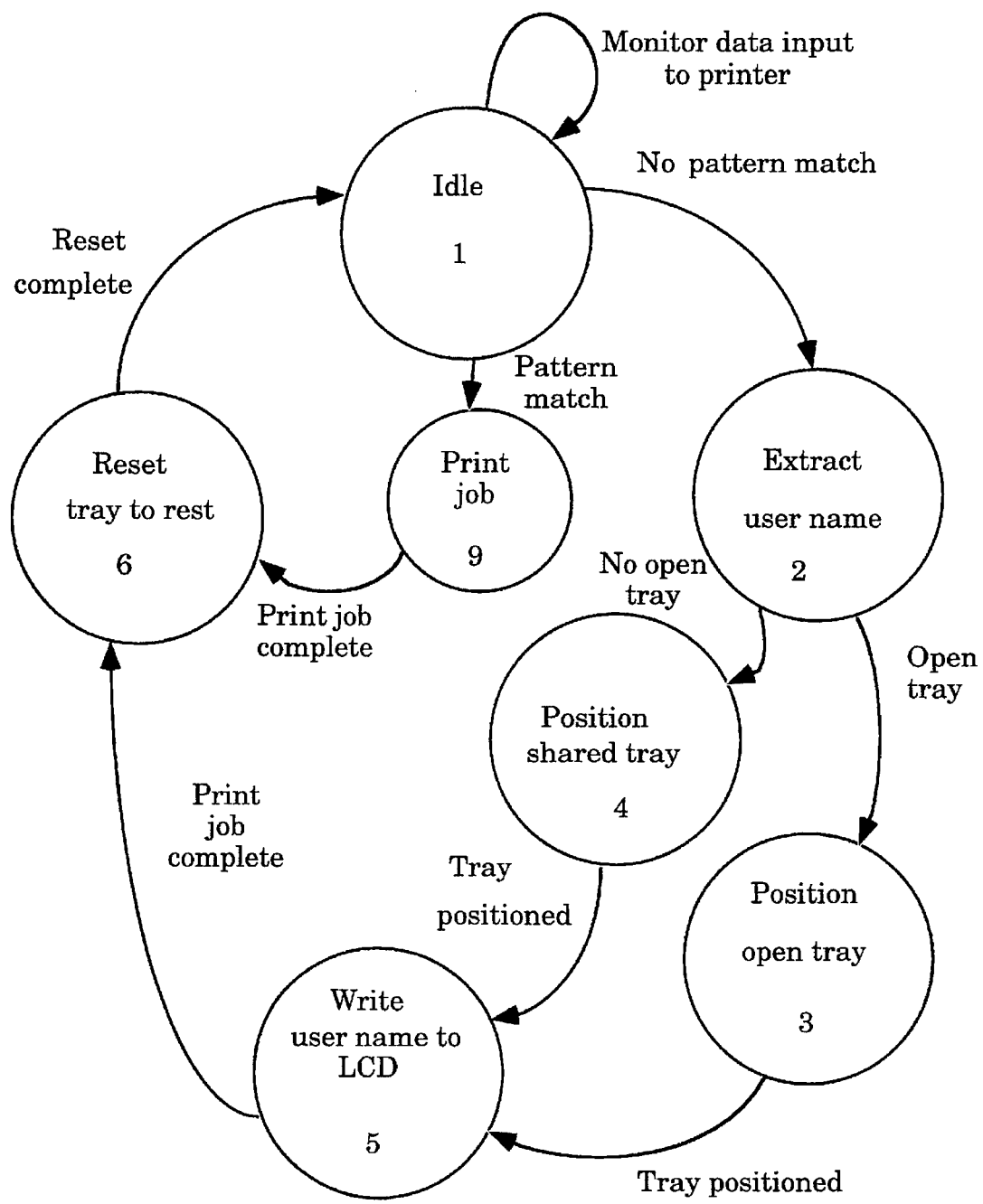
FIG. 2 is a state diagram of the printer output director of the present invention.

FIG. 2 is a state machine for the printer output director of the present invention. In state 1, the printer output director of the present invention is in an idle state while the control logic of the printer output director monitors the incoming RS 232 serial data, or parallel data or network transmitted from a computer for the banner page.

In one embodiment of the present invention, the banner page is detected by a banner page detector from special control characters inserted right before the banner page by a program running on the computer. In an alternate embodiment, the banner page detector of the printer distinguishes the banner page from the actual print data by the format of the serial, parallel or network data input. If the input data is not in one of the formats representing the actual printer output, then the control logic determines that the incoming serial data represents the banner page.

If the user name or identifier in the banner information matches a user name or identifier stored in a buffer memory of the printer, then there is a pattern match. The printer output pages are delivered to the tray corresponding to the matched user name or identifier and the print job is processed in state 9. The state transfers to state 6 when the print job is complete.

If on the other hand, the user name or identifier is not found in the buffer memory, then there is no pattern match. In state 2, the user name/identifier is extracted from the first 128 bytes of the input data which make up the banner page and stored in the buffer memory as the pattern to be matched and displayed on one of the LCD panels. If there is an open tray, then in state 3, the open tray is positioned to receive a print job. Otherwise, if there are no open trays available, then in state 4, a shared tray is positioned to receive the print job. Once a tray is positioned to receive the print job, the user name extracted in state 2 is written into the LCD panel in state 5.

Once the print job is complete, the buffer memory is cleared of the specified pattern and the printer output director of the present invention is reset to receive an incoming data from the computer. When reset is completed, the printer output director returns to the idle state 1.

What has been described is a method and apparatus for a printer output director for assigning print jobs of different users to different output trays and displaying a user identifier on each LCD panel corresponding to each output tray. The printer output director of the present invention allows for separation and easy identification of a print job output.

While certain exemplary embodiments have been described in detail and shown in the accompanying drawings, it is to be understood that such embodiments are merely illustrative and not restrictive on the broad invention and that this invention not be limited to the specific arrangements and constructions shown and described, since various other modifications may occur to those ordinarily skilled in the art.

What is claimed is:

1. An apparatus for directing printed outputs comprising:

a plurality of output trays;

control logic for coupling to a computer, said control logic monitoring data transmission from a computer and extracting a user identifier which uniquely identifies a predetermined user, said computer comprising, an executing program which inserts control characters preceding said user identifier to indicate to said control logic that said user identifier follows said control characters; and tray control logic for controlling and directing printed outputs for said predetermined user to a corresponding one of said plurality of output trays assigned to said predetermined user using said user identifier, wherein said control characters do not appear on said printed outputs.

2. The apparatus of claim 1 wherein said data transmission comprises serial data.

3. The apparatus of claim 1 wherein said data transmission comprises parallel data.

4. The apparatus of claim 1 wherein said data transmission comprises network printing data.

5. The apparatus of claim 1 wherein said control logic further comprises a user identifier detector which detects if incoming data transmission from said computer is in actual print data format and determines that said incoming data is for a user identifier if said incoming data is not in an actual print data format.

6. The apparatus of claim 1 further comprising:

a buffer memory for storing data input from a computer; and a microswitch for sensing when said tray is no longer in use transmitting that information to control logic.

7. The apparatus of claim 1 wherein said tray control logic further comprises a tray motor controller for moving a stack of trays up and down to position an open tray to receive printed output pages and to reset a tray when said tray is no longer in use.

8. The apparatus of claim 1 further comprising:

an LCD panel corresponding to said output tray for displaying said user identifier; and an LCD panel control circuitry for controlling said LCD panel.

9. A method for directing print job outputs on a digital computer having a processor and a memory with a plurality of output trays, said method implemented using a computer program executed on said computer comprising the steps of:

receiving data from a computer including a user identifier, print job data and control characters preceding said user identifier to indicate that characters following said control characters are said user identifier;

monitoring said data from said computer for said user identifier; and directing printed output pages corresponding to said print job data to different output trays of a printer according to said user identifier wherein said control characters do not appear on said printed output pages.

10. The method of claim 9 wherein said step of monitoring said data further comprises the steps of:

detecting if said data is in an actual print data format; and determining that said data is for said user identifier if said data is not in said actual print data format.

11. The method of claim 9 wherein said step of extracting said user identifier from said data further comprises the step of storing said user identifier in a buffer memory.

12. The method of claim 10 wherein said step of extracting said user identifier further comprises the step of determining if said user identifier matches one of the user identifiers in a user identifier list stored in a buffer memory of said digital machine.

13. The method of claim 10 wherein said step of directing printed output pages further comprises the steps of:

sensing when said output trays are no longer in use;

moving a stack of trays up and down to position an open tray to receive printed output pages; and resetting a tray when said tray is no longer in use.

14. The method of claim 10 further comprising the step of displaying identifying character sets extracted from said data input from said computer.

15. The method of claim 10 wherein said data comprises serial data.

16. The method of claim 10 wherein said data comprises parallel data.

17. The method of claim 9 wherein said data comprises network printing data.

* * * * *